United States Patent [19]

Prakash et al.

[11] Patent Number: 4,884,857

[45] Date of Patent: Dec. 5, 1989

[54] SCANNER FOR USE IN MULTIPLE SPOT LASER ELECTROPHOTOGRAPHIC PRINTER

[75] Inventors: Ravinder Prakash, Ardsley, N.Y.; Larry L. Wolfe, Broomfield, Colo.

[73] Assignee: International Business Machines Corporation, Armonk, N.Y.

[21] Appl. No.: 118,720

[22] Filed: Nov. 9, 1987

[51] Int. Cl.⁴ .............................................. G02B 26/10
[52] U.S. Cl. ....................................... 350/6.8; 350/449
[58] Field of Search ..................... 350/6.8, 96.28, 449, 350/527, 318, 96.24; 372/103, 24

[56] References Cited

U.S. PATENT DOCUMENTS

| | | | |
|---|---|---|---|
| 3,926,500 | 12/1975 | Frosch et al. | 350/527 |
| 4,001,705 | 1/1977 | Sinclair et al. | 372/24 |
| 4,156,555 | 5/1979 | McMahon | 350/3.75 |
| 4,204,725 | 5/1980 | DiStefano et al. | 355/3 R |
| 4,257,669 | 3/1981 | Scorteanu et al. | 350/6.8 |
| 4,283,147 | 8/1981 | Dreyfus et al. | 350/449 |
| 4,424,442 | 1/1984 | Kitamura | 350/6.8 |
| 4,511,755 | 4/1985 | Mori | 350/96.24 |
| 4,544,264 | 10/1985 | Bassetti et al. | 355/14 R |
| 4,560,999 | 12/1985 | Tokuhara | 346/160 |
| 4,561,717 | 12/1985 | Kataoka et al. | 350/6.8 |
| 4,565,421 | 1/1986 | Minoura | 350/6.8 |
| 4,571,603 | 2/1986 | Hornbeck et al. | 346/160 |
| 4,590,492 | 5/1986 | Meier | 350/96.24 |
| 4,596,992 | 6/1986 | Hornbeck | 346/76 PH |
| 4,617,578 | 10/1986 | Nezu et al. | 350/6.8 |
| 4,624,543 | 11/1986 | Young et al. | 355/3 R |
| 4,625,222 | 11/1986 | Bassetti et al. | 346/160 |
| 4,635,082 | 1/1987 | Domoto et al. | 346/160 |
| 4,636,817 | 1/1987 | Masaki | 346/160 |
| 4,676,592 | 6/1987 | Nishioka et al. | 350/96.28 |
| 4,744,615 | 5/1988 | Fan et al. | 350/96.28 |

FOREIGN PATENT DOCUMENTS 1303976  4/1987  U.S.S.R. ............................. 350/449

OTHER PUBLICATIONS

IBM Technical Disclosure Bulletin, "Improving Resolution of a Laser Beam Printer", vol. 26, No. 3B, Aug. 1983.

Primary Examiner—John K. Corbin
Assistant Examiner—Martin Lerner
Attorney, Agent, or Firm—Philip J. Feig

[57] ABSTRACT

An image scanning apparatus for use on a laser electrophotographic printer provides improved imaging in both the scan and process direction in a printer using a multiple spot printhead.

20 Claims, 7 Drawing Sheets

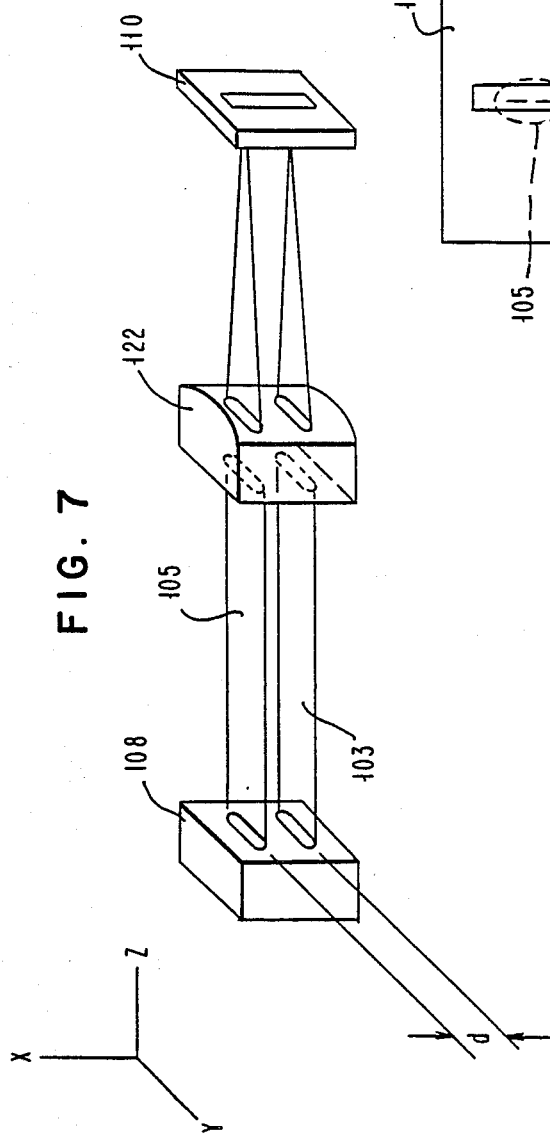
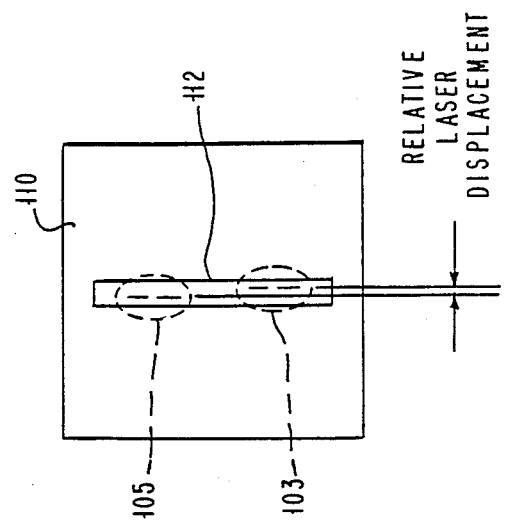
FIG. 7
FIG. 8

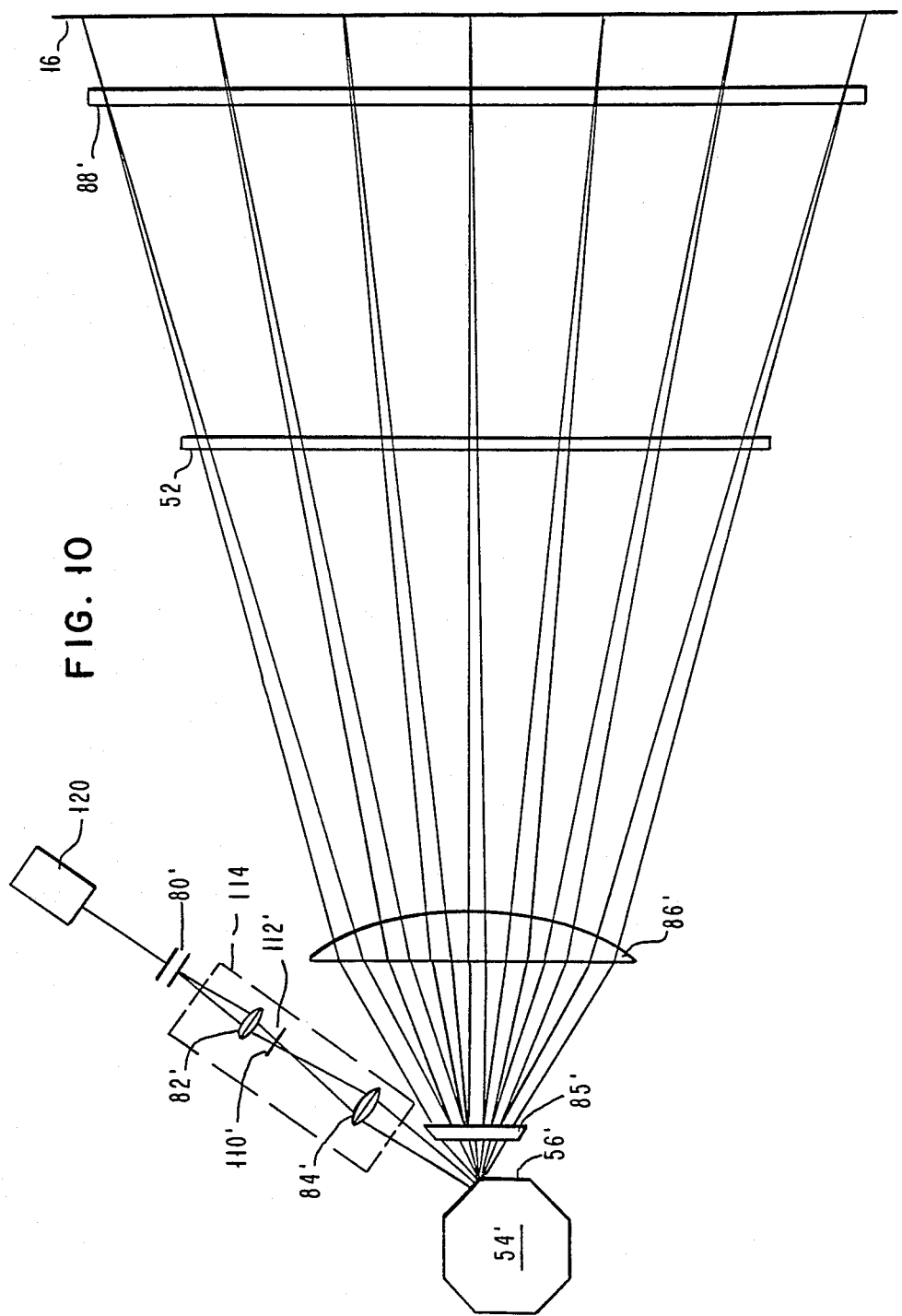

SCANNER FOR USE IN MULTIPLE SPOT LASER ELECTROPHOTOGRAPHIC PRINTER

BACKGROUND OF THE INVENTION

This invention relates to laser electrophotographic printers and more specifically relates to an image scanning apparatus providing improved imaging in both the scan and process direction using a multiple spot printhead.

Electrophotographic printers are designed to create an image by placing a series of picture elements (pels) on an image receiving material. For example, an image may be created by a light source, such as one or more lasers, which is caused to scan across a photoconductor surface in a succession of scan lines. The light beam or beams place a series of overlapping pels on the photoconductor surface. Each pel is placed in a pel area and the light beam is modulated so that some pel areas are exposed to light and some are not. Whenever a pel containing light strikes the photoconductor surface, the surface is discharged at that pel location. In this manner, the photoconductor surface is caused to bear a charge pattern of pels which matches the object image that is to be reproduced. The printed copy is obtained by developing the charge pattern and transferring the developed image to print material, usually paper.

Electrophotographic printers are well known in the art and are described, for instance, in U.S. Pat. No. 4,544,264 issued to Larry W. Bassetti, dated Oct. 1, 1985 and U.S. Pat. No. 4,625,222, issued to Larry W. Bassetti et al, dated Nov. 25, 1986, both assigned to the assignee of the present invention.

The resolution of images produced by a laser electrophotographic printer is generally stated in terms of pels per inch. A typical printer, commercially available today, has a resolution of 480 pels per inch.

Increased performance requirements of electrophotographic printing has placed a heavy burden on the printheads. Increased speed, pel density and the like require higher rotating polygon mirror speeds, more facets on the polygon mirror and reduced pel times. Higher rotating polygon mirror speeds, in turn, result in larger motor mechanisms and more complex synchronization mechanisms.

Multiple spot imaging offers an opportunity to provide the sought after improved performance while overcoming the concerns cited above. By scanning multiple spots or pels in lieu of a single scan line, the printing speed is increased. Preferably two to six laser beams are used in order to achieve a favorable balance between speed, pel density and laser power versus polygon spinner considerations. For example, in the IBM 3800 model III printer, an acousto-optic modulator is used to split a HeNe laser into two, independently controlled, laser beams.

In addition, many systems have been proposed to optically combine semiconductor laser outputs to perform multiple spot imaging. Several problems, some of a fundamental nature, have prevented such systems from emerging as viable technologies.

An objective of multiple spot printers is to provide an image which has a spacing equal to one pel in the process direction and uniform pel displacement in the scan direction. In the present invention, the result is achieved in two steps. First, an image is generated which has the required one pel spacing in the process direction and no separation in the scan direction. Subsequently, an image is generated having uniform pel displacement in the scan direction.

The term "scan direction" refers to the direction of scan of the light beam across the photoconductor surface. The term "process direction" refers to the direction of movement of the photoconductor surface upon which the image is projected. In simple terms, the scan direction may be thought of as left-to-right and the process direction as top-to-bottom. Of course, the directions may be reversed or interchanged as determined by the light scan system and photoconductor motive system.

SUMMARY OF THE INVENTION

In the present invention, each spot of the multiple spot image on the photoconductor surface is formed by a separate, independent laser beam. The optical system for controlling the spot locations at the image or photoconductor plane can best be described by looking at the optical performance in two planes. The first plane (process plane) affecting only the process direction pel placement and the second plane (scan plane) affecting only the scan direction pel placement.

In the process plane, an aperture plate containing a multiplicity of apertures is illuminated by discrete lasers, each laser illuminating a respective aperture. An optical system comprising prescan and postscan optical elements illuminates and images the apertures onto the photoconductor surface. By proper selection of the prescan and postscan optical systems, the spots or pels in the image are located with controlled separation in the process direction. By imaging a multiplicity of illuminated apertures onto the photoconductor surface, the relative spacing between adjacent laser spots are controlled by the aperture spacing and not by the laser positions.

In the scan plane, a second aperture plate containing a single aperture is located at a conjugate plane from the photoconductor surface. Each discrete laser beam incorporated into the system is focused onto this scan aperture plate illuminating the single aperture. With proper selection of the prescan and postscan optical systems, uniform pel placement in the scan direction is achieved. Similar to the process direction described above, it is the imaging of a single aperture which is illuminated by a multiplicity of lasers which controls the relative spot locations and not the individual laser positions themselves.

The terms prescan and postscan refer to the optical systems the light beams travel through before and after reflecting from a polygon mirror scanner respectively.

A principal object of the invention is, therefore, the provision of a multiple spot laser electrophotographic printer exhibiting uniform spacing of pels in both the scan and process directions.

Another object of the invention is the provision of an aperture imaging arrangement in an electrophotographic printer for controlling pel separation in the process direction.

A further object of the invention is the provision of an aperture imaging arrangement in an electrographic printer for controlling pel separation in the scan direction.

Further and still other objects of the invention will become more clearly apparent when the following description is read in conjunction with the accompanying drawings.

BRIEF DESCRIPTION OF THE DRAWINGS

FIGS. 7 is a schematic representation of an embodiment for illuminating the scan direction aperture;

FIGS. 8 is a schematic representation of dual beam illumination of a single slit scan direction aperture;

FIG. 10 is a schematic representation of the invention in a portion of a laser multiple spot electrophotographic printer.

DETAILED DESCRIPTION

Figure 1:
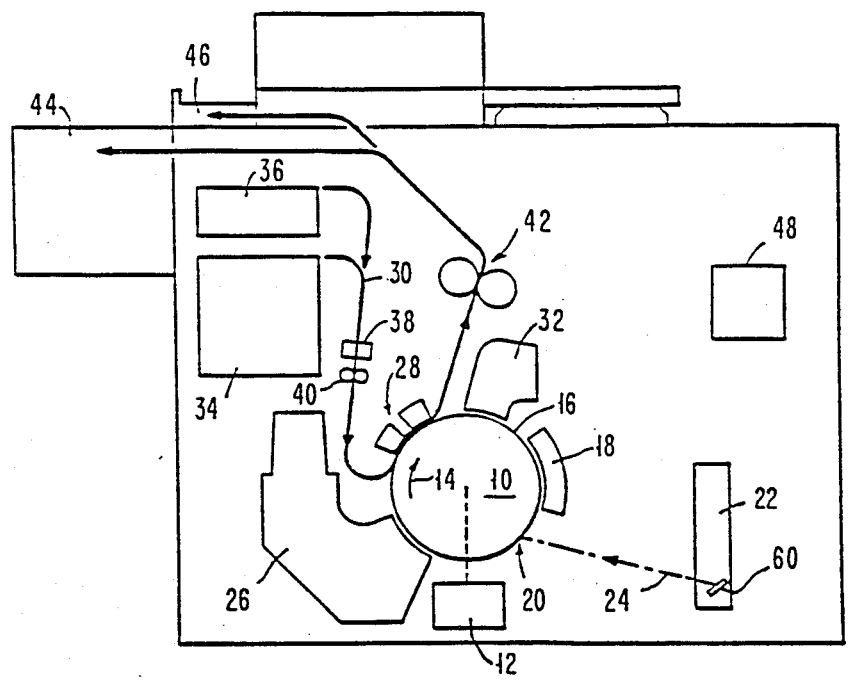
FIG. 1 is a schematic representation of a typical electrophotographic printer.

Referring now to the figures and FIG. 1 in particular, there is shown a typical electrophotographic laser printer. An electrophotographic drum 10 is driven by motor 12 in direction of arrow 14. Drum 10 carries photoconductive material 16 which passes under a charge corona generator 18 to charge the photoconductive material to a suitable voltage. The photoconductive material is discharged at exposure station 20 according to the image to be reproduced. The image is produced by a scanning system 22 consisting of a laser printhead which produces modulated laser beams 24. The latent image is developed at the developer station 26 and transferred by corona generator 28 to image receiving material (typically copy paper) traversing the paper path 30. The photoconductive material 16 continues to cleaning station 32 before continuing for receiving another image. Copy paper may be stored in either bin 34 or 36 and fed into the paper path 30 to a gate 38, through pinch rolls 40 and through transfer station 28 onto the fusing rolls 42. The finished print is then passed to an exit pocket 44 or to a finishing station 46.

Box 48 represents the control circuit for controlling the operation of the printer and may contain one or more of any suitable microprocessor.

Figure 2:
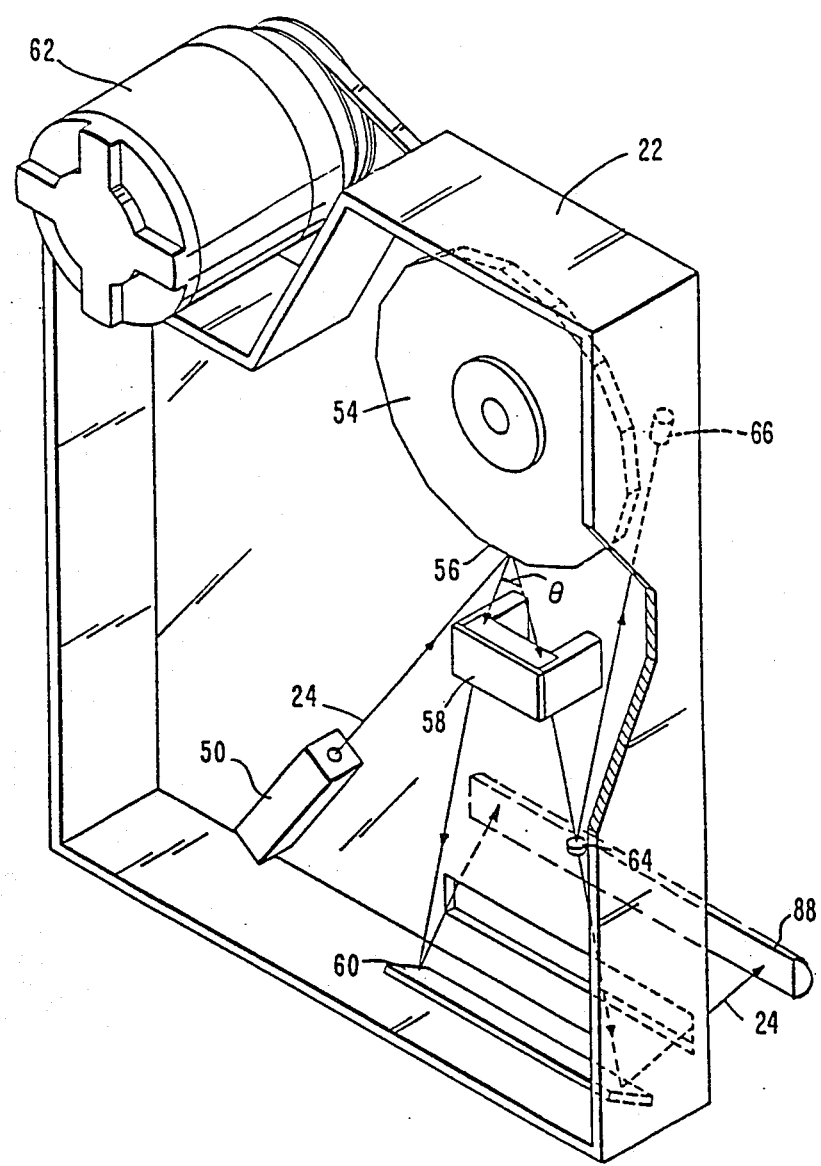
FIG. 2 is a schematic representation of a laser scanning system for use in an electrophotographic printer.

The scanning system 22 is shown in more detail in FIG. 2 where one or more solid-state laser chips and most of the mechanism of the present invention are housed in assembly 50. A plurality of laser beams 24 generated by a plurality of semiconductor lasers pass from assembly 50 to a rotating polygonal mirror 54 which has a plurality of facets such as facet 56 around its periphery. The laser beams 24 are reflected from a single facet at a time in such a manner as to scan through an angle $\theta$. As the mirror rotates, each facet 56 causes the beams to scan through an angle $\theta$. After reflecting from the rotating mirror facet, the beams are passed through optical assembly 58 to shape the beam and to focus it on the photoconductive surface 16. A beam folding mirror 60 is shown illustrating the final folding mechanism to direct the laser beams 24 through lens 88 and onto the photoconductor surface 16. Motor 62 is coupled to drive the rotating mirror 54. A start-of-scan mirror 64 is provided to direct the laser beam to a start-of-scan detector 66.

Multiple spots are produced on the photoconductor surface 16 from a plurality of lasers by the reflection of the laser beams across a single facet 56 on rotating mirror 54. The quantity of spots in a scan line depends upon the quantity of lasers in assembly 50. Multiple laser output beams are optically combined to form multiple spots.

Figure 3:
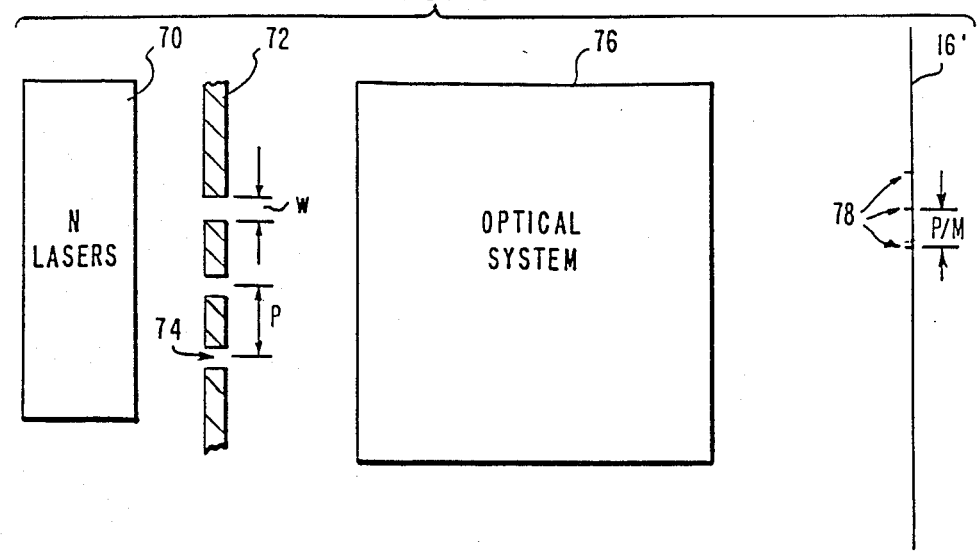
FIG. 3 is a schematic representation of an embodiment for controlling the spot separation in the process direction.

Referring now to FIG. 3, there is shown a schematic representation of an embodiment for controlling the separation of the pels in the process direction while providing no separation in the scan direction. In the prior art embodiment, the laser cavity of each laser is imaged onto the photoconductor surface 16. Such systems typically have an image magnification in the order of 20. It is known that the lasing point drifts due to a change in thermal conditions resulting in a shift in the location of the associated spot on the photoconductor surface. For example, if two laser spots are intended to be separated in the process direction by three pels, the thermal drift effect can cause the spacing to be two or four pels. Such separation will be clearly apparent in the finished document and hence, is most undesirable.

The same situation applies in the scan direction where ideally the scanning beams would be in line perpendicular to the scan direction as the photoconductive surface is scanned. For a system with a typical magnification of 20, shifts of one laser with respect to another would result in shifts in the image 20 times greater when measured at the photoconductor plane.

In the present arrangement of illuminating mechanical apertures and imaging these apertures with the associated optical systems, the spot locations are independent of minor laser position variations. In the present invention, it is predominately the apertures which provide the spot locations, not the laser position.

In FIG. 3, N semiconductor lasers and associated optical systems are disposed in laser assembly 70. Disposed in front of the arrayed lasers in assembly 70 is an opaque aperture plate 72 containing N rectangular apertures 74. The apertures 74 are arranged so that each aperture 74 is illuminated by only one laser beam from one of the N laser beams generated by the N lasers in assembly 70. The rectangular apertures have a width W, length L, aspect ratio R and pitch P. The aspect ratio is defined as the length L divided by the width W, and is selected to be in the order of 10 or more.

The optical system 76, in the arrangement shown, provides optics for imaging the apertures 74 onto the photoconductor surface for varying scan angles. The post scan optical portion of optical system 76 also provides correction for polygon facet pyramidal errors thereby substantially reducing the effects of perturbations which could affect spot location in the process direction from scan line to scan line or within a scan line.

The described embodiment is configured so that aperture plate 72 and the image plane, i.e. photoconductor surface 16', are in conjugate planes for the process direction.

The optical system 76 is designed to cause demagnification of the object, namely the apertures 74, when imaged on the photoconductor surface 16'. The optical system 76 images the N rectangular apertures to generate N spots on the photoconductor surface. The demagnification M is selected to provide the desired spot size in the process direction. Moreover, by proper selection of the aperture pitch P, the spots 78 are separated on the photoconductor surface by the desired values.

Figure 4:
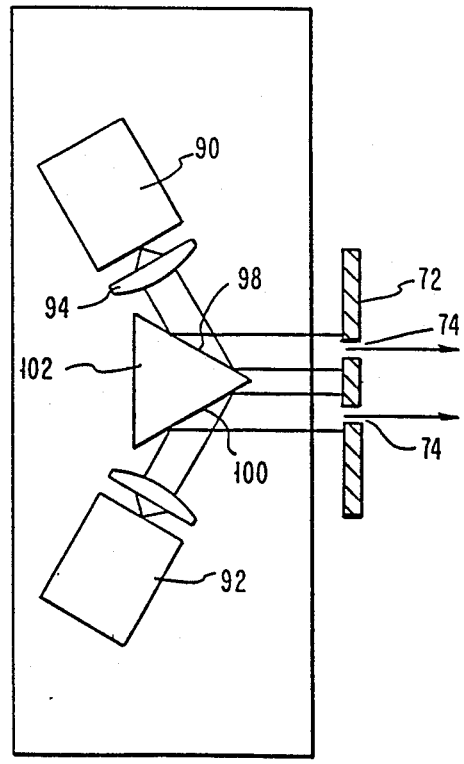
FIG. 4 is a schematic representation of a dual source aperture illumination system.

There are several embodiments for assuring that each aperture is illuminated by only one laser. In a two spot system, a prism arrangement such as that shown in FIG. 4 is preferred where laser 90 and laser 92 each transmits a light beam through respective collimation lenses 94, 96. Each collimated beam is then directed onto upper mirrored surface 98 and lower mirrored surface 100 of a prism 102 respectively whereat the beams are reflected through two apertures 74 in aperture plate 72. After passing through the apertures, the beams are directed to the photoconductor surface 16 for forming two spots as described above. It will be apparent to those skilled in the art, that the prism 102 may be replaced with two plano mirrors and still achieve the same result.

It will also be apparent to those skilled in the art that by the use of properly selected mirrors and/or optical systems, any quantity of lasers, N, may be used so that each laser beam illuminates only one of the N apertures in an aperture plate.

Figure 5:
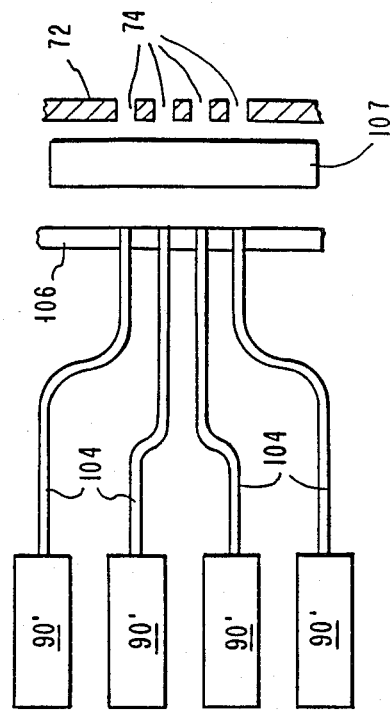
FIG. 5 is a schematic representation of an alternative embodiment of the arrangement per FIG. 4 showing a four source illumination system.

In an alternative embodiment shown in FIG. 5, a plurality of semiconductor lasers 90' are arranged so that each of the laser light beams is coupled to one end of a respective optical fiber pigtail 104. The other end of each pigtail 104 is connected to a support plate 106 having a plurality of holders therein for supporting the pigtails so that the light beams are spaced in the process direction at a pitch P equal to the pitch of the apertures 74 in plate 72. The described arrangement results in each light beam illuminating a single aperture. Disposed in the light path between the plate 106 and aperture plate 72 is a negative cylindrical lens 107 for expanding the beams in the scan direction.

Figure 6:
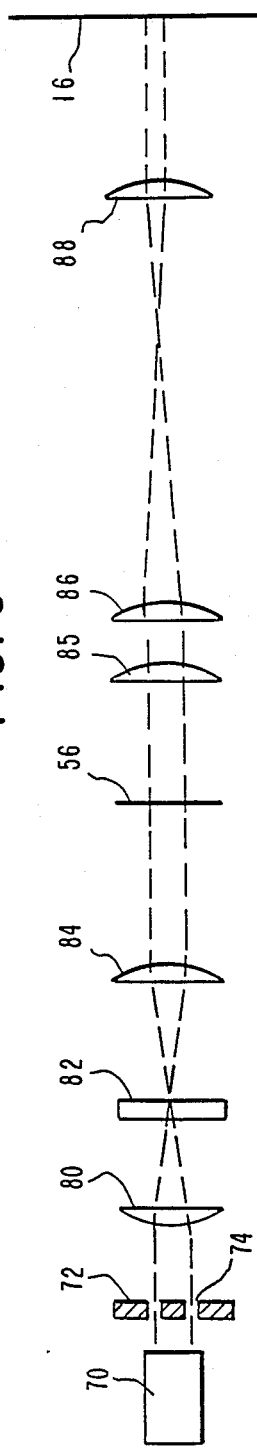
FIG. 6 is a more detailed representation of the embodiment in FIG. 3 detailing the optics in the process direction plane.

In a preferred embodiment per FIG. 6, the process direction aperture plate 72 is placed directly in front of the multibeam laser assembly 70. Cylindrical lens 80 is spaced its focal length away from aperture plate 72. After the beams pass through the process apertures 74, the beams continue through cylindrical lenses 80 and 82, and spherical lens 84. Cylindrical lens 80 and spherical lens 84 are of equal focal length and are placed two focal lengths apart. These elements image the process direction aperture 74 onto intermediate plane 56 which is a polygon mirror facet. Lens 82 and 84 comprise a scan direction expansion set.

After traversing through the prescan optics, each laser beam next travels through post scan field lenses 85, 86 and 88. These post scan lenses reimage the intermediate image formed at facet 56 onto the photoconductor surface 16. The reimaged final image is a demagified image of the original aperture 72.

Having described several embodiments for controlling the spot spacing in the process direction, several embodiments will be described which control the spot spacing in the scan direction.

It is desirable in multiple spot laser printing to provide one pel spacing in the process direction and no separation in the scan direction as described above. Laser module 108 shown in FIG. 7 provides two laser beams 103 and 105 which are shown linearly separated by a distance d. A similar arrangement is possible with angularly separated beams transmitted from a laser module. However, for the sake of simplicity, only a linearly separated arrangement is shown. In order to achieve no separation of the laser beams, and hence the spots, in the scan direction, the central ray of each beam must be contained in, or be parallel to the X-Z plane as shown in FIG. 7. The X-Z plane is parallel to the scan direction plane. The two beams 103 and 105 travel through lens 122 and are focused onto aperture plate 110.

There are inherent problems which arise after construction of the module 108. As a result of thermal expansion and mechanical settling, the relative positions of the individual lasers change, thereby changing the initial alignment. The precise system sensitivity to shifting is dependent upon the laser module design. In some systems, spot shift due to thermal expansion may be large. Typically, in an imaging printhead system, spot placement uniformity of ±10 microns is the goal. Therefore, if the optical system provides a typical magnification of 20, the laser position must be held to within ±0.5 microns with respect to the remaining optical system. In such a system, after final assembly and alignment, any thermal shift which causes a relative motion of one-half microns or more would render the printer unacceptable.

FIG. 8 is a schematic representation of the scan aperture plate 110. The aperture 112 is chosen such that the width is smaller than the scan direction beam diameter at focus. By overfilling the beam on the aperture plate, the central beams are redefined to the center of the aperture opening. Shifts of the beams centers, relative to one another, prior to the aperture are now redefined to be in line, parallel to the aperture slit.

Figure 9:
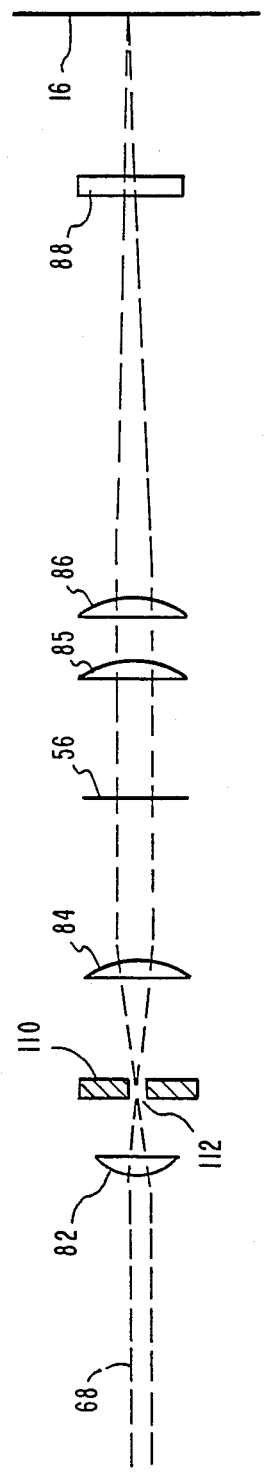
FIG. 9 is an embodiment of an optical system for producing uniform spot placement in the scan direction.

FIG. 9 is a schematic representation of the scan direction optics that results in no scan direction separation when there are small shifts in the mechanical alignment of the laser module. Each laser beam 68 passes through an expansion set comprising a first cylindrical lens 82, aperture 112 in aperture plate 110 and a lens 84. After being expanded, the beams are reflected from polygon mirror facet 56 which directs the beams through the postscan optics 85, 86 and 88.

The lenses and aperture plate are dimensionally and spatially located to achieve the following results: the beam diameter having been defined by the aperture width must be of a size to produce the desired spot diameter on the photoconductor surface and the laser beams must be focused in plane of plate 110.

The plane of the aperture and the image plane, i.e. the plane of the photoconductor surface, are conjugate planes. The imaged spots in the plane of plate 110 may be thought of as light sources which are imaged onto the photoconductor surface by the remaining known optical system. That is, it is the light beam passing through aperture 112 which is imaged on the photoconductor surface.

In a typical example, the laser beam spot size at the plane of plate 11 is 22 microns. The aperture slit is approximately 16 microns in the scan direction and several millimeters in the process direction. As a result, since the aperture plate 10 and photoconductor surface 16 are in conjugate planes, the 16 micron aperture will be imaged on the photoconductor surface. As long as the aperture 112 is along the process direction, and has minimal skew in the scan plane, the imaged spots will also be along the process direction with minimal skew in the scan plane.

The post aperture optics must allow for the correct scan spot size on the photoconductor surface. This is accomplished by designing the correct power of the lenses 82 and 84 of the expansion set. In the described configuration, the input beam 68 could shift by a few microns, ±3 microns in the given example, resulting in substantially no shift in the image on the photoconductor surface. Since the laser beam illuminates an area of the plate 110 around the aperture 112, a small shift in the laser light path will not affect the multiple spot image so long as the aperture remains substantially illuminated. It will be apparent therefore, that when assembling the scanner, the mechanical tolerances while important, are not critical since small variations in laser position will not manifest itself at the photoconductor surface. The same is true for any aperture system where only a portion of the entire light beam passes through an aperture. The result is a scanning system which is easier to manufacture and service as well as being dimensionally stable over thermal cycling and long-term drifting of the individual laser assemblies.

As the input beam into the aperture 112 shifts, the energy transmitted through the aperture 112 varies. By using a known laser power servo system, compensation for the change in spot energy is accomplished. Minor shifts in laser position results in power variations which are readily corrected by using a laser power servo system. The result is that the spatial relationship between spots is preserved even if the lasers shift position.

In all the described arrangements, the laser beam over fills each aperture thereby truncating the beam. It is the aperture that is imaged and controls the final beam position, not the original laser beam. With a suitable amount of overfill, tests have shown that the laser can move plus or minus 25 percent of the aperture width without creating printed image problems.

Having now described arrangements for controlling spot or pel placement in the process direction and in the scan direction, FIG. 10 shows schematically an arrangement combining the two processes for use in a multiple spot laser electrophotographic printer.

Laser system 120 in FIG. 10 contains N semiconductor lasers, an aperture plate 72 having N apertures 74 and an optical system of the type shown and described in conjunction with FIGS. 4 and 5. The laser beams from assembly 120 pass through a cylindrical lens 80' selected for controlling the process direction placement. The elements in the dashed box 114 represent generally the expansion set shown and described in conjunction with FIG. 9. Lens 82' is a cylindrical lens selected for controlling the spot placement in the scan direction. The aperture plate 110' containing aperture 112' is positioned at a conjugate plane with the image plane at photoconductor surface 16. Lens 84' is a positive lens which completes the expansion set and recollimates the beam in the scan direction. The lenses 80' and 84' are selected for projecting the image apertures onto rotating polygon mirror 54' in a one-to-one relationship with the pel size and position from laser system 121 in the process direction.

After reflecting from facet 56' of rotating polygon mirror 54' in the embodiment shown in FIG. 10, the scanning laser beams first pass through a planoconvex negative lens 85', a planoconcave positive lens 86', a window 52 and a process direction cylindrical lens 88'. After passing through the lens 88', multiple pels are printed on photoconductor surface 16 which has controlled spacing in both the scan direction and process direction. The multiple pel printhead generates a single scan line of N laser beams for each rotation corresponding to polygon mirror facet 56'.

It will be apparent that the embodiment per FIG. 10 is easily placed into scanning system box 22 for use in an electrophotographic printer of the type shown in FIG. 1.

While there has been described and illustrated several embodiments of scanners for use in an electrophotographic printer, it will be apparent to those skilled in the art that modifications and variations thereon are possible without deviating from the scope of the invention which shall be limited solely by the appended claims.

Having thus described our invention, what we claim as new, and desire to secure by Letters Patent is:

1. An image scanning apparatus for use in a multiple spot laser electrophotographic printer for projecting an object image onto a photoconductor surface comprising:
   a plurality of laser means each laser means transmitting a light beam responsive to an object image;
   first optical system means including a first aperture plate containing a plurality of apertures disposed for causing each of the plurality of light beams to illuminate a respective one of said plurality of apertures;
   a rotating polygon mirror means; and
   second optical system means including a second aperture plate containing an aperture disposed for receiving light beams passing through said first aperture plate, said second aperture plate being disposed at a conjugate plane with the photoconductor surface, said second optical system means being disposed for projecting said light beams onto said rotating polygon mirror means from which said object image onto said photoconductor surface.

2. An image scanning apparatus as set forth in claim 1, wherein said first optical system means includes lens means for directing each of said light beams to illuminate a respective one of said plurality of apertures.

3. An image scanning apparatus as set forth in claim 2, and said lens means directing each of said light beams to illuminate an area of said first aperture plate around each of said apertures.

4. An image scanning apparatus as set forth in claim 1, wherein said laser means comprise semiconductor lasers.

5. An image scanning apparatus as set forth in claim 1, wherein said second optical system means includes lens means for directing said light beams to illuminate said aperture of said second aperture plate.

6. An image scanning apparatus as set forth in claim 5, wherein said lens means is a cylindrical lens.

7. An image scanning apparatus as set forth in claim 5, and said lens means focussing each of said light beams to illuminate an area of said second aperture plate around the aperture.

8. An image scanning apparatus as set forth in claim 7, wherein said lens means is a cylindrical lens.

9. A lens system for use in a multispot image scanner apparatus in which a plurality of light beams are generated for controlling the spacing in the process direction comprising:
   an aperture plate containing a plurality of apertures;
   focussing means disposed for receiving each of said plurality of light beams and causing each of said light beams to illuminate a respective aperture in said aperture plate, and lens means disposed for receiving said plurality of light beams after passing through said apertures and focusing said light beams at an image plane.

10. A lens system for use in a multispot image scanner apparatus in which a plurality of light beams are generated for controlling the spacing in the scan direction comprising:
an aperture plate containing an aperture disposed at a conjugate plane with an image plane;
focussing means disposed for receiving each of said plurality of light beams and causing each of said light beams to be focused at said aperture, and lens means disposed for receiving said light beams after passing through said aperture and focussing said light beams at the image plane.

11. A lens system as set forth in claim 17, wherein said focussing means comprises a cylindrical lens and said lens means comprises a spherical lens.

12. An imaging apparatus comprising:
a plurality of laser means, each laser means transmitting a light beam responsive to an object image;
first optical system means including a first aperture plate containing a plurality of apertures disposed for causing each one of said plurality of light beams to illuminate a respective one of said plurality of apertures, and
second optical system means including a second aperture plate containing an aperture disposed for receiving light beams passing through said first optical system means, said second aperture plate being disposed at a conjugate plane with respect to an image plane, said second optical system means being disposed for projecting said light beams as spots on an image plane.

13. An image scanning apparatus for use in a multiple spot laser electrophotographic printer for projecting an object image onto a photoconductor surface comprising:
a plurality of laser means each laser means transmitting a light beam responsive to an object image;
first optical system means including a first aperture plate containing a plurality of apertures;
fiber optic means disposed in relation to said laser means for guiding each of said light beams from said laser means to said first aperture plate for causing each of the plurality of light beams to illuminate a respective one of said apertures;
a rotating polygon mirror means, and
second optical system means including a second aperture plate containing an aperture disposed for receiving light beams passing through said first aperture plate, said second aperture plate being disposed at a conjugate plane with the photoconductor surface, said second optical system means being disposed for projecting said light beams onto said rotating polygon mirror means from which said object image is projected onto said photoconductor surface.

14. An image scanning apparatus as set forth in claim 13, further including a support plate, said fiber optic means terminating at said support plate for aligning said plurality of light beams to illuminate said plurality of apertures in said first aperture plate.

15. An image scanning apparatus as set forth in claim 14, further including lens means disposed between said support plate and said first aperture plate for focussing said plurality of light beams to illuminate respective apertures in said first aperture plate.

16. An image scanning apparatus as set forth in claim 15, wherein said lens means focussing each of said light beams illuminating an area of said first aperture plate around each of said apertures.

17. An image scanning apparatus as set forth in claim 16, wherein said lens is a negative cylindrical lens.

18. A lens system for use in a multispot image scanner apparatus in which a plurality of light beams are generated for controlling the spacing in the process direction comprising:
an aperture plate containing a plurality of apertures;
focussing means including a support plate, fiber optic means disposed for receiving and guiding each of said light beams, said fiber optics means terminating at said support plate disposed opposite said aperture plate, and cylindrical lens means disposed between said support plate and said aperture plate for causing each of said light beams to illuminate a respective aperture in said aperture plate, and
lens means disposed for receiving said plurality of light beams after passing through said apertures and focussing said light beams at an image plane.

19. A lens system as set forth in claim 18, wherein said fiber optic means terminates in holders in said support plate.

20. A lens system for use in a multispot image scanner apparatus in which a plurality of light beams are generated for controlling the spacing in the scan direction comprising:
an aperture plate containing an aperture disposed at a conjugate plane with an image plane;
focussing means disposed for receiving each of said plurality of light beams and causing each of said light beams to be focused at said aperture;
lens means disposed for receiving said light beams after passing through said aperture and focussing said light beams at the image plane, and
laser power servo means for varying the power of said light beams responsive to the light beam energy transmitted through said aperture.

* * * * *